United States Patent [19]

Taylor

[11] Patent Number: 5,168,924
[45] Date of Patent: Dec. 8, 1992

[54] LOW SURFACE DISTORTION MONOCHROMATOR

[75] Inventor: William D. Taylor, Sandy Hook, Conn.

[73] Assignee: Hughes Danbury Optical Systems, Inc., Danbury, Conn.

[21] Appl. No.: 723,081

[22] Filed: Jun. 28, 1991

[51] Int. Cl.$^5$ ............................ F28F 3/12; G02B 5/08
[52] U.S. Cl. .................................. 165/168; 165/170; 359/845
[58] Field of Search .................. 165/168, 170, 185; 359/845

[56] References Cited

U.S. PATENT DOCUMENTS

| | | | |
|---|---|---|---|
| 3,645,608 | 2/1972 | Staley et al. | 359/845 |
| 3,708,223 | 1/1973 | Sorensen et al. | 165/170 |
| 3,781,094 | 12/1973 | Griest | 165/168 |
| 3,923,383 | 12/1975 | Engel et al. | 165/170 |
| 4,003,641 | 1/1977 | Heinz et al. | 359/845 |
| 4,253,739 | 3/1981 | Carlson | 359/845 |
| 4,478,277 | 10/1984 | Friedman et al. | 165/170 |
| 4,489,570 | 12/1984 | Little | 165/168 |
| 4,628,991 | 12/1986 | Hsiao et al. | 165/168 |
| 4,895,436 | 1/1990 | Shen | 359/845 |
| 4,932,767 | 6/1990 | Vivaldi | 359/845 |
| 4,934,803 | 6/1990 | Ealey | 359/845 |
| 5,005,640 | 4/1991 | Lapinski et al. | 165/170 |
| 5,073,831 | 12/1991 | Flint | 359/845 |

Primary Examiner—John Rivell
Assistant Examiner—L. R. Leo
Attorney, Agent, or Firm—W. K. Denson-Low; W. J. Streeter; R. A. Hays

[57] ABSTRACT

A monochromator 18 has a thin faceplate which reduces temperature-induced distortion in a strain-free region by placing it close to a two-level heat exchanger 46, 64. The heat exchanger has a first level 46 in juxtaposition with the faceplate 22 for efficient heat extraction, and a second level 64 which establishes a constant temperature plane along a neutral bending axis of the monochromator 18. The first level heat exchanger is operated at a temperature below the zero CTE point of the silicon faceplate so that the integrated CTE of the faceplate is approximately zero. Pumps 30 and 32 are disposed respectively at the coolant inlets 26 and outlets 28 for fine-tuning the coolant pressure so that a minimal pressure across the faceplate 22 may be established to minimize bending moments on the thin faceplate. The upper and lower heat exchangers 46, 64 are comprised of a plurality of micro-channels which are divided into groups, each group associated with a macro-channel 40, 60 and a return plenum 48, 68 which tapers down to an orifice 50, 72, which is connected to a return header 52, 74. The sizes of the orifices 50, 72 may be adjusted to control the amount of coolant flow through each macro channel so that the cooling provided may be matched to the heat absorbed by the faceplate.

25 Claims, 5 Drawing Sheets

LOW SURFACE DISTORTION MONOCHROMATOR

BACKGROUND OF THE INVENTION

1. Field of the Invention

The present invention relates to a low surface distortion optical device, such as a monochromator and, more particularly, to the specific structural arrangement used to achieve low surface distortion when the surface is heated.

Description of the Prior Art

The purpose of a monochromator is to selectively defract a narrow band of energy, for example, X-rays, from a broadband source and reject undesired wavelengths. This is accomplished by using the lattice structure of silicon crystals as the defracting medium. Any distortion of the silicon lattice tends to smear the defracted waves. In one application, typical synchrotron sources, only approximately the upper 100 microns of the silicon surface function to defract the desired wavelengths. The X-rays that are not defracted are absorbed by the silicon as heat.

Excessive thermal buildup in the silicon can result in thermal distortion of the monochromator, which may be caused by silicon expansion per se, or by bending resulting from uneven expansion of the materials of the monochromator.

Referring to FIG. 1, there is a schematic illustration of a double crystal monochromator, wherein a first crystal 10 is placed in a high-power X-ray beam 16. Ideally, the beam is received at an acute angle $\theta 1$ and is reflected from the surface of the crystal 10 at a slightly different angle $\theta 2$. The reflected beam then impinges on a second crystal 12 to be reflected to a using device 14.

Due to excessive thermal buildup, expansion or warping of the first crystal 10 may take place, as shown in FIG. 1, particularly where the beam 16 impinges on the crystal surface. The surface distortion gives rise to defracted rays dispersed in both wavelength and direction, so that they can no longer simultaneously satisfy the Bragg condition for a particular angular setting of the second crystal 12. Hence, only a fraction of the beam's cross-section is defracted by the second crystal, resulting in a loss of throughput.

A monochromator is particularly sensitive to the thermal buildup, since the beam impinges upon the monochromator surface at an angle, so that the beam distribution on the surface is uneven, as shown in FIG. 2, which illustrates the surface of the monochromator 10 that is illuminated by an incoming beam 16.

Referring to FIG. 3, there is shown a three-dimensional plot of the power density of the beam as it hits the surface. The heat that may be absorbed by the monochromator is proportional to the power density. In FIG. 3, power density is plotted along the Y-axis in kilowatts/(milliradian)$^2$, the X-axis represents angular space in beam cross-section by beam longitudinal dispersion (milliradians)$^2$, and the Z-axis represents angular space in beam height by beam longitudinal dispersion (milliradians)$^2$.

As is evident from FIG. 3, the surface heating of the monochromator is extremely uneven, and quickly leads to undesired surface distortion.

Prior art devices have concentrated on cooling the silicon crystal, with a cooling system and geometry designed not only to remove heat but also to minimize the thermal deformation.

Various systems have been developed for cooling monochromators and other optical devices which absorb high-energy radiation. An accepted way for cooling these devices is through the use of internal cooling, wherein the device is mounted on a cooling manifold for distributing a coolant in proximity to the optical device for providing the required cooling. In order to enhance the cooling efficiency, a turbulent coolant flow was often desired.

Optical devices such as monochromators generally include an optical faceplate having an exposed surface for receiving the required radiation. In most instances, as previously mentioned, the active portion of the faceplate material lies within approximately 100 um of the exposed faceplate surface; therefore, any thickness of the faceplate over about 100 um is considered to be excess and may be needed only for structural purposes. In order to provide the most efficient cooling possible, the active material should be in close proximity to the coolant; therefore, it is desirable that the faceplate be made as thin as possible. Most prior art devices have had a relatively thick faceplate on the order of 2 mm or larger.

While it is desirable to have a thin faceplate, this desirable characteristic results in additional problems, in that the thin faceplate is structurally weak and therefore may be adversely affected by the pressure and flow characteristics of the coolant. High coolant pressures can result in a bowing or bending of the faceplate. A turbulent flow of the coolant can generate vibrations in the faceplate. Any displacement or movement of the faceplate surface will distort the resulting radiation.

It has become customary to provide small cooling channels along a surface of a coolant manifold, with said surface being covered by the faceplate, so that the faceplate essentially forms one wall of the cooling channels. This structure provides the beneficial result that the coolant is in direct contact with the faceplate material, but again subjects the faceplate to coolant pressure and vibration due to turbulent coolant flow, thereby necessitating a thick faceplate for structural purposes. The thick faceplate impedes the heat flow from the optical surface to the coolant.

Most prior art devices have either paid little attention to controlling the coolant flow in each channel, or have micro-managed the flow such that each coolant channel has its own inlet and outlet and flow control means. The former approach results in a simple design but rather uneven cooling that can result in unacceptable thermal distortions in the device. The latter approach is extremely complicated, requiring flow control for each micro-channel, resulting in excessively high cost.

In order to reduce the coolant pressure and the possible distortion on the faceplate, some prior art systems have used a dual pumping arrangement so that the coolant pressure may be reduced without a diminution of the coolant flow rate.

SUMMARY OF THE INVENTION

The present invention contemplates an optical device such as a monochromator which uniquely combines several structural features to reduce the strain in the silicon lattice so as to provide a low surface distortion device. The device will include the following structural features:

1. a unique manifold configuration;

2. a thin silicon faceplate;
3. coolant at a temperature below the zero coefficient of thermal expansion (CTE) point of silicon;
4. a two-level heat exchanger (HEX); and
5. pumps at both inlet and outlet sides of the HEX.

The unique manifold configuration provides efficient cooling, temperature control and a controlled coolant flow. The manifold is designed so that individual microchannels are grouped into a plurality of macro-channels. These macro-channels are physically separated from each other, each having its own inlet and outlet to supply and return headers. Each macro-channel outlet comprises an exit plenum chamber tapering to an orifice, the size of which is used to control the coolant flow through the macro-channel. A rib structure is used to physically separate the macro-channels from each other above the supply header. The ribs extend to the manifold surface on which the faceplate is mounted so that the ribs provide additional structural support for the cooled faceplate in the area of the macro-channels.

The supply and return headers are each divided and have two oppositely disposed supply inputs and two oppositely disposed return outlets. This unique positioning tends to neutralize supply and return forces exerted on the optical device. The exit plenums for the macro-channels are located outwardly from an active aperture area of the optical device, so as to minimize the effects of flow turbulence in the exit plenum.

When a power density distribution similar to that shown in FIG. 3 is experienced, the present invention may be uniquely used to control the amount of coolant fluid flowing through the macro channels, so that a cooling gradient may be established to match the gradient of heat absorption experienced in the optical device. Thus, a greater amount of coolant flow may be provided at the center of the device and lesser amounts at the ends, so that the heat extraction may be made to match the heat buildup experienced by the absorption of radiation.

By using a thin faceplate, the heated surface of the faceplate is disposed in closer proximity to the coolant flowing through the heat exchanger for more efficient heat extraction and a smaller temperature gradient through the faceplate.

By using coolant at a temperature below the zero CTE point of silicon, the integrated CTE of the faceplate is approximately zero.

The unique use of a two-level HEX to remove the absorbed heat allows the monochromator to be designed such that the net heat-induced bending moment is zero over approximately the upper 100 microns of the faceplate. The first level of the HEX, which is in juxtaposition with the faceplate, provides for the distribution of coolant from the center of the faceplate to the sides in opposite directions through a plurality of micro-channels, each associated with a larger macro-channel having its coolant flow controlled by an orifice, as mentioned previously. The return side of the first level HEX functions as the supply side of a second lower level HEX which utilizes larger channels because the heat removal requirements are less. The lower level HEX is positioned at an axis of the monochromator such that bending of the faceplate is zero. Essentially, the lower level HEX functions to establish an isothermal area within the monochromator, the temperature of which is a function of the top level HEX, the input radiation and the structural rigidity of the monochromator.

The use of pumps at both inlet and outlet sides of the HEX allows for fine-tuning of the coolant pressure across the faceplate that can be used to add or subtract from the bending moments in the faceplate. This feature will allow a designer to maintain a near-zero pressure across the faceplate. Such pressure control allows for minimum faceplate thickness.

The thinner the faceplate, the lesser the temperature gradients experienced near the surface, which will result in lower bending moments.

The unique combination of these features significantly reduces the induced strain on the faceplate and results in a low surface distortion.

A primary objective of the present invention is to provide a low surface distortion optical device such as a monochromator.

Another objective of the present invention is to provide a monochromator having a thin faceplate so as to reduce the thermal gradient induced bending moments within the faceplate.

Another objective of the present invention is to control and reduce the coolant pressure on the faceplate to thereby allow for the use of a thinner faceplate.

Another objective of the present invention is to use a double-layer HEX to provide more efficient cooling and an isothermal area, thereby reducing induced bending moments.

DETAILED DESCRIPTION OF THE PREFERRED EMBODIMENT

Figure 1:
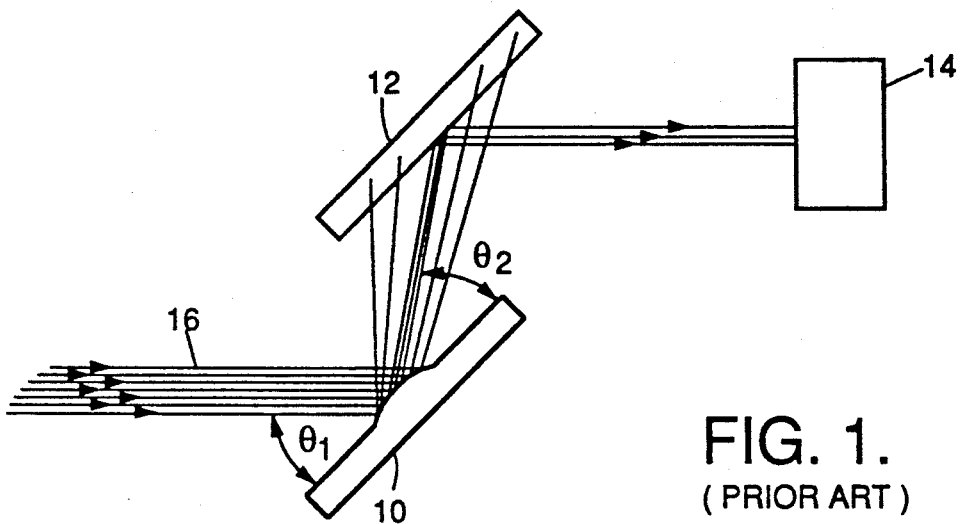
FIG. 1 is a schematic representation of a double crystal monochromator illustrating the problems resulting from thermal stress.
Figure 2:
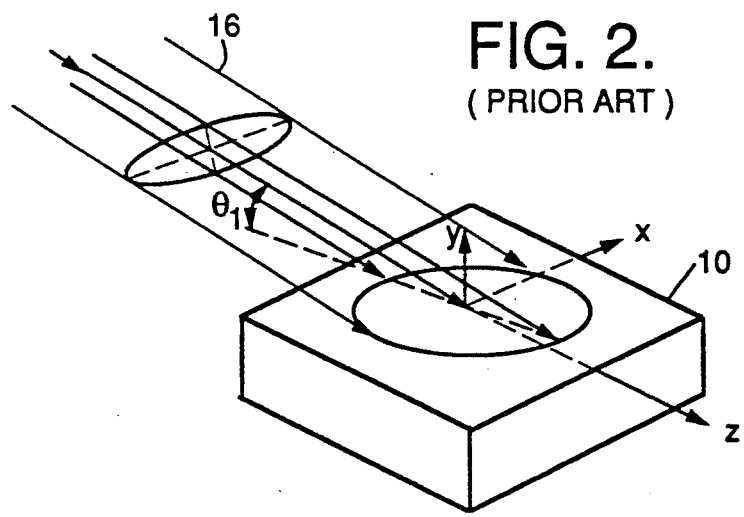
FIG. 2 is an isometric view of a single crystal of a monochromator.
Figure 4:
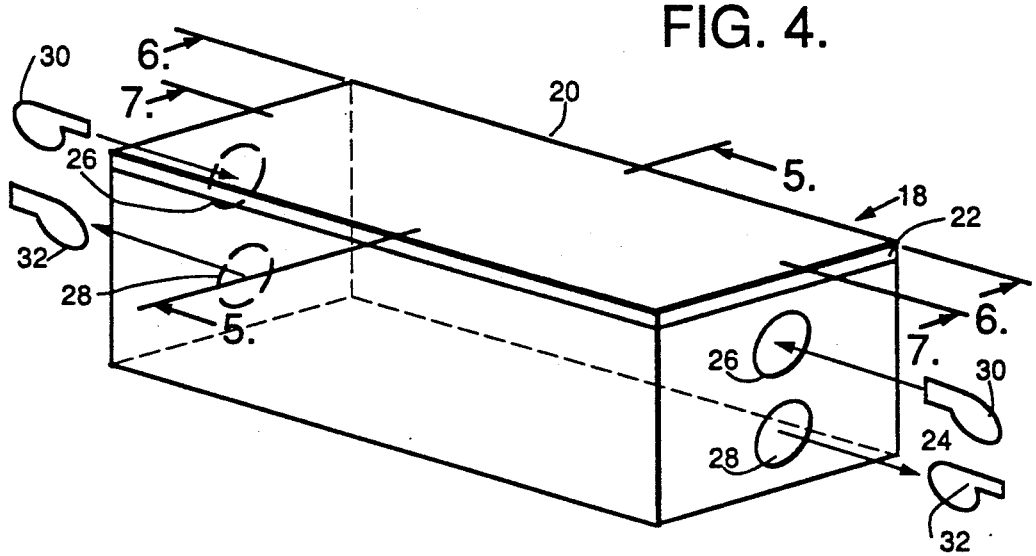
FIG. 4 is an isometric view of a monochromator of the present invention.
Figure 5:
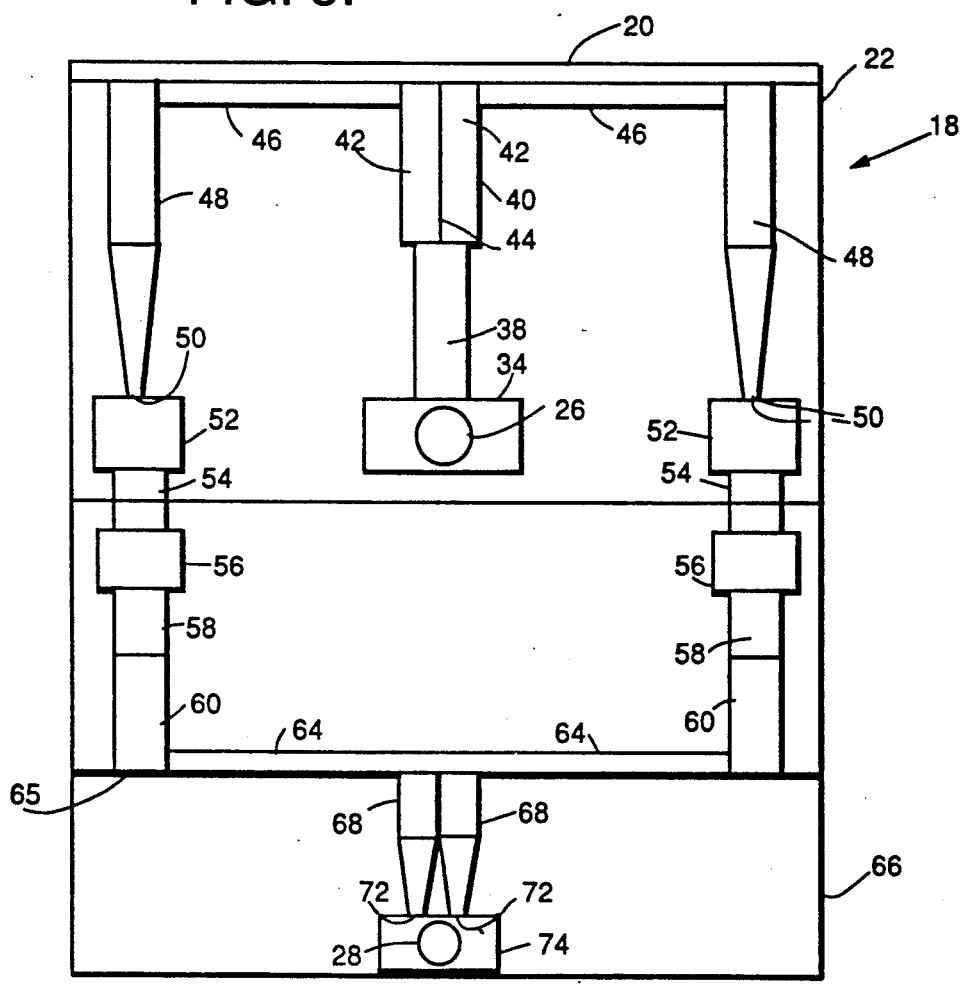
FIG. 5 is a cross-sectional view of the monochromator of FIG. 4, taken along line 5—5.
Figure 6:
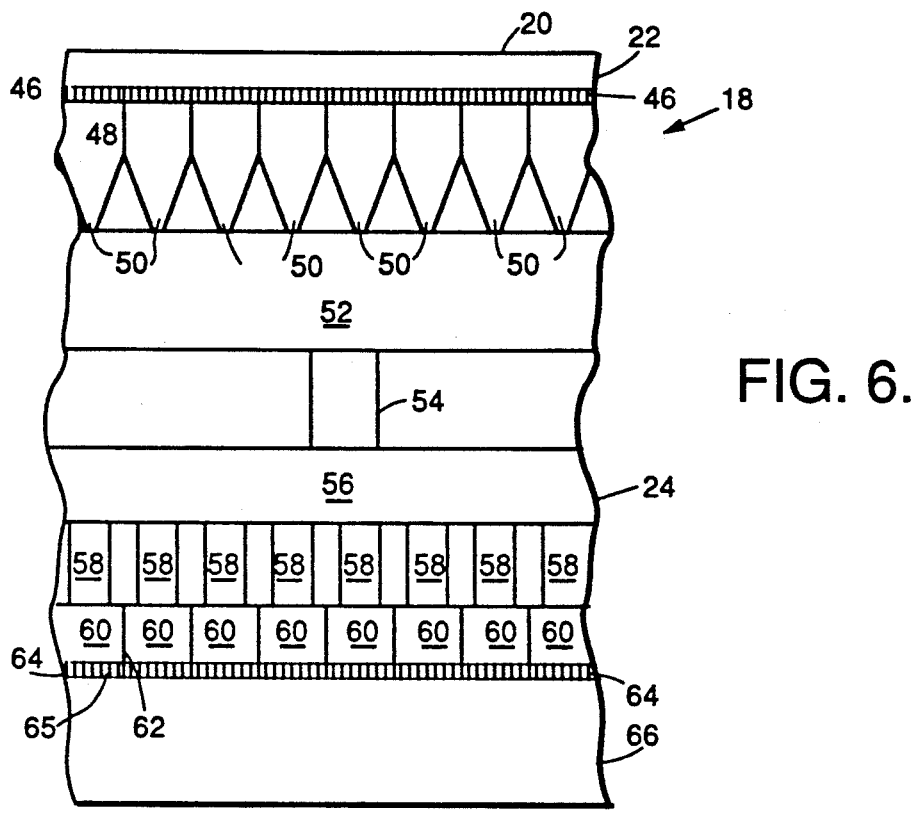
FIG. 6 is a cross-sectional view of the monochromator of FIG. 4, taken along line 6—6.
Figure 7:
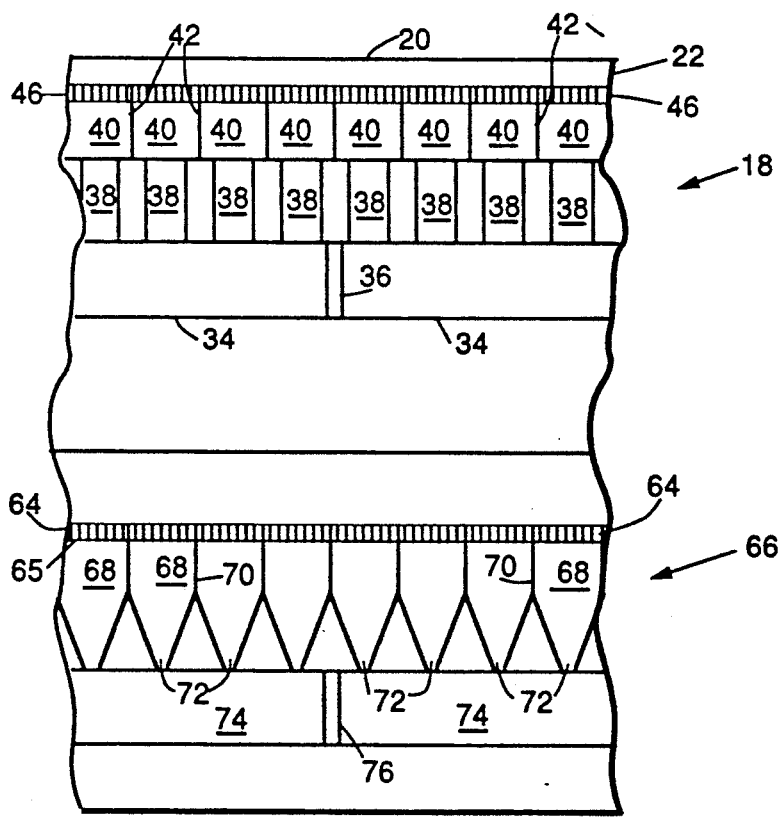
FIG. 7 is a cross-sectional view of the monochromator of FIG. 4, taken along line 7—7.
Figure 8:
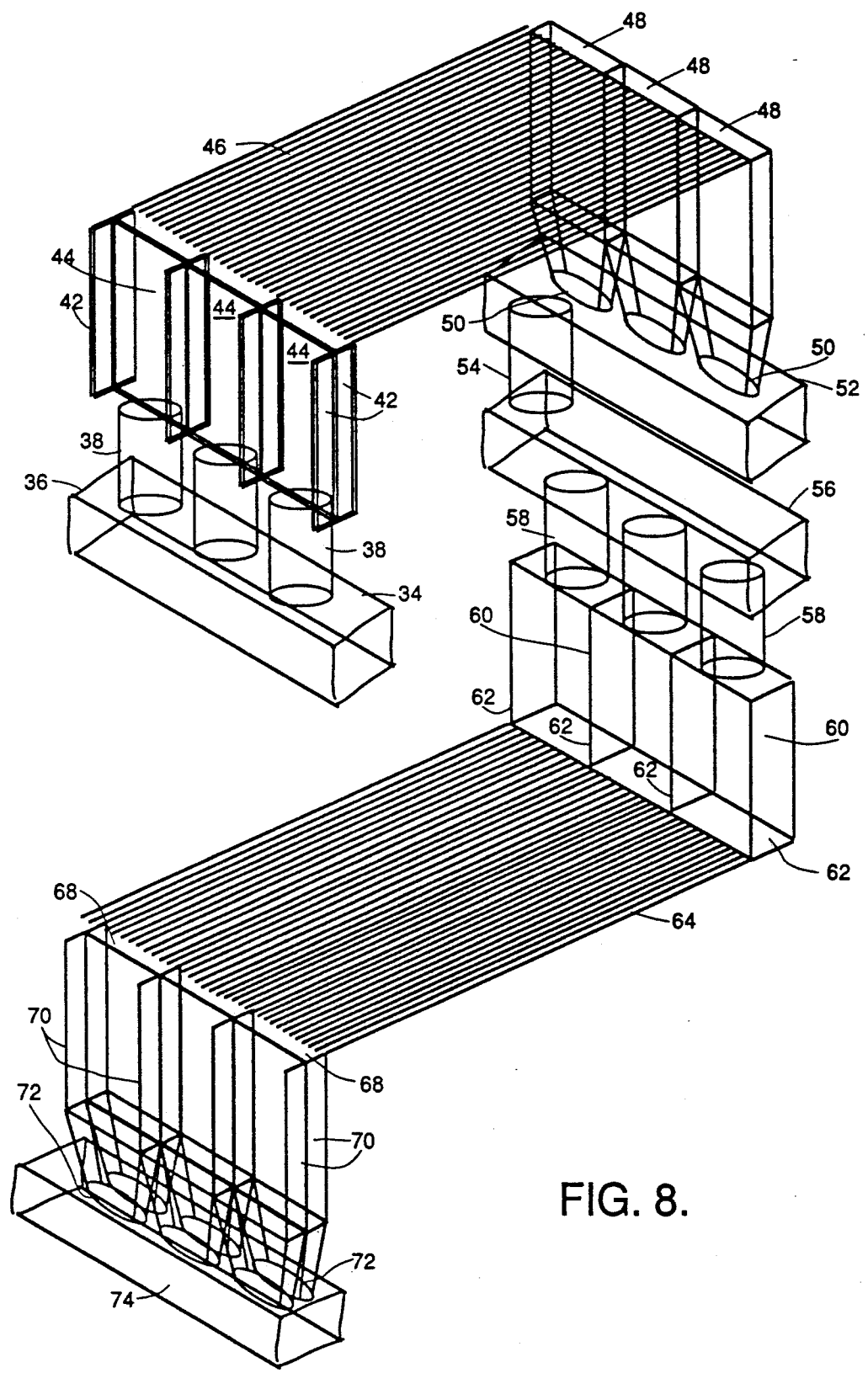
FIG. 8 is an exploded, enlarged partial isometric view showing a portion of the monochromator of FIG. 4.

Referring to FIG. 4, there is shown a monochromator 18 constructed in accordance with the present invention and having a surface 20 that, in this embodiment is adapted to receive X-rays from a broadband source at an acute angle similar to that shown in FIG. 2 and to selectively defract a narrow band of X-rays and reject non-desired wavelengths. This function is accomplished by using the lattice structure of silicon crystals of a faceplate 22. The faceplate may be made of any type of single crystal material, but is preferably silicon having a (111), (222) or (333) lattice structure. The active depth of the silicon for monochromator purposes is on the order of about 100 um; therefore, additional thickness of the faceplate is merely excess material that reduces cooling efficiency. The active depth or thickness of the silicon varies depending upon wavelength and beam power. The critical issue is that excess material reduces cooling efficiency.

The surface 20 of faceplate 22 is irradiated with a beam of broadband X-rays, and the lattice structure of the silicon crystals functions to defract the beam, reflecting the desired wavelengths at a slightly different angle than that at which the radiation was received. The X-rays that are not defracted are absorbed by the silicon faceplate as heat. In typical devices, approximately 95-99% of the X-rays are absorbed as heat. The absorbed X-rays may have a power distribution similar to that shown in FIG. 3, resulting in a corresponding heat buildup within the faceplate 22.

The monochromator 18 of FIG. 4 includes a substrate 24. Many different materials may be used for the substrate, so long as they have characteristics, particularly a coefficient of thermal expansion that is compatible with the faceplate material. The substrate 24 may be constructed of a glass material provided by Schott Glass under the tradename of ZERODUR, or may also be made of silicon carbide or silicon. The faceplate 22 is bonded to the substrate 24, using a compatible bonding method, depending on the substrate material, such as frit or electrostatic bonding.

The substrate 24 may comprise a number of sheets of substrate material bonded together. This arrangement will facilitate the construction of a coolant manifold within the substrate. The coolant manifold is provided with two coolant inlets 26 and two coolant outlets 28. Coolant is provided to the inlets 26 under pressure provided by coolant pumps 30. Figure 4 shows the use of two pumps, one associated with each inlet 26; however, it is to be understood that one pump could be used to provide coolant under pressure to both inlets. In a similar manner, pumps 32 are connected to the outlets 28 to assist in returning of the coolant from the manifold. A single pump 32 could be used to withdraw coolant from both outlets 28. Pumps 30 and 32 may be adjusted to fine-tune the pressure within the manifold, thereby allowing a designer to maintain a near-zero pressure across pressure-sensitive portions of the manifold, such as areas adjacent the faceplate.

A more detailed understanding of the manifold contained within the monochromator 18 may be had from a review of FIGS. 5-8. The inlets 26 are connected to supply headers 34 at each side of the monochromator. The supply headers 34 meet in the middle of the monochromator and are separated by a partition 36, so that coolant flow entering from each end does not mix and create excessive turbulence. A plurality of branch tubes 38 extend upwardly from the supply headers 34 to provide coolant flow to macro-channels 40. Macro-channel ribs 42 are provided to separate adjacent macro-channels from each other. Dividing ribs 44 extend from one macro-channel rib 42 to another and function to bisect branch tubes 38 to divide the coolant flow received therefrom. Ribs 42 and 44 extend upwardly to a top surface of the manifold, as is shown most clearly in FIGS. 5, 7 and 8, and serve a secondary function of supporting the thin faceplate 22 in the area of the macro-channel openings, to prevent faceplate distortion and vibration in such areas. A plurality of micro-channels 46 are formed in an upper surface of the manifold substrate 24 and extend in opposite directions perpendicular to the supply header 34, to carry coolant in an outwardly direction from the macro-channels 40. Each macro-channel 40 is connected to a group of micro-channels 46. A group may include from 5-20 micro-channels; however, the exact number is not important to the practice of the invention and may vary, depending upon the particular application.

In like manner, the exact size of the micro-channels will depend upon the application to which the invention is applied. In one structural embodiment, the micro-channels are 80 um wide and 1,000 um deep, with an 80 um separation between each channel. The channels are closed by the faceplate 22 which is bonded to the top surface of the substrate 24. The closed channels define flow passages wherein coolant is in direct contact with the faceplate.

Figure 3:
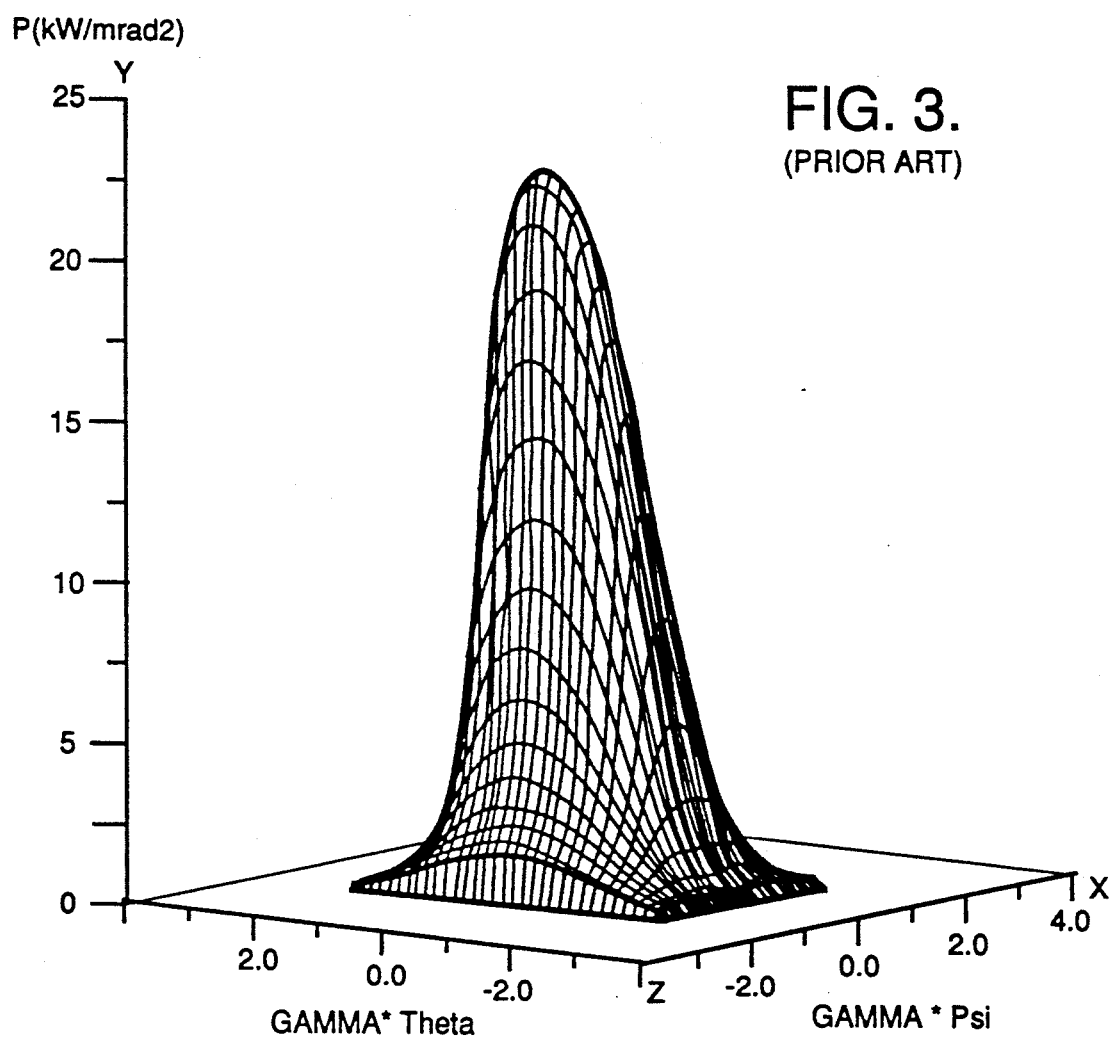
FIG. 3 is a three-dimensional plot illustrating the density of absorbed power in a monochromator.

Micro-channels associated with each macro-channel extend across the upper surface of the manifold and terminate at a plenum chamber 48 associated with each macro-channel. Each plenum chamber 48 has a lower portion that tapers to an orifice 50, which is sized to control the flow of coolant through its associated macro-channel. The tapered portion of the plenum chamber is preferably elliptical in cross-section, terminating in an elliptical-shaped orifice 50. The purpose of the orifices 50 is to control the pressure drop and therefore the coolant flow across each macro-channel. By varying the size of the orifices, a cooling gradient along the length of the faceplate 22 can be controlled to match a heat input gradient as shown in FIG. 3.

While the present invention shows a rectangular-shaped faceplate 22, it is contemplated that the present invention may be used with other-shaped faceplates, such as circular or elliptical faceplates. In such an event, the sizes of the orifices may be varied in an attempt to substantially equalize the pressure drops and coolant flows across the various macro-channels. Shorter macro-channels will have smaller orifices, so that the sum of the pressure drop across the macro-channel and its associated orifice will be equal for all macro-channel/orifice combinations. Of course, the orifice size can also be changed to establish a desired cooling gradient.

As shown in FIG. 2, the area of the faceplate which absorbs the most heat from the X-ray beam will be substantially centered on the faceplate; therefore, the plenum chambers 48 extend beyond the active area of the faceplate so that any coolant flow-induced distortions of the faceplate will be in a non-critical area. At the plenums and orifices, the coolant flow will inherently be somewhat turbulent, thereby causing possible vibration and slight movement of the faceplate. By locating these components outside of the critical area of the faceplate, the effect of such vibration is minimized.

The orifices terminate in return headers 52 which extend along each side of the monochromator 18. Return headers 52 communicate with a conduit 54 located midway of each return header for providing an exit for the coolant flow from the return headers 52. The conduits 54 are connected to lower HEX supply headers 56 disposed along each side of the monochromator 18. The supply headers 56 are connected to a plurality of branch tubes 58 which extend downwardly from the supply headers 56 and provide coolant to macro-channels 60 of the lower HEX. Macro-channels 60 are divided by ribs 62 which function to separate adjacent macro-channels from each other.

A plurality of larger micro-channels 64 are formed in the substrate 24, preferably at a seam 65 formed between substrate portions, so that the micro-channels 64 may be closed by a lower substrate portion 66. The larger micro-channels 64 are associated in groups with individual macro-channels 60, with approximately five micro-channels 64 for each macro-channel 60. The micro-channels 64 may, as an example, have a width of 635 um to 1270 um and a depth of 381 um to 1016 um, with a separation of approximately 635 um to 1016 um. Again, it is to be understood that the size of the micro-channels 64 may vary considerably with the application to which the invention is used.

The micro-channels extend from the sides back to the center of the monochromator 18 and terminate at centrally-located plenum chambers 68 associated with each macro-channel. The plenum chambers 68 are separated by ribs 70 and terminate at lower ends with tapered portions extending downwardly to orifices 72. The sizes of the orifices 72 may be adjusted to control the cooling provided to any portion of the monochromator 18.

Orifices 72 open to return headers 74 which are connected to the outlets 28 for returning coolant from the monochromator. The return headers 74 are divided by a partition 76 to direct the coolant flow to opposite ends of the monochromator.

The lower heat exchanger formed by micro-channels 64 is disposed within the monochromator at a location along a neutral bending axis of the monochromator. By locating the constant temperature plane created by the lower heat exchanger at the neutral bending axis, the bending moments exerted on the monochromator are significantly reduced. The 'neutral bending' axis location is a function of the heat input to the monochromator, the faceplate thickness and the structural rigidity, and is located to structurally cancel out thermal gradient induced bending of the faceplate by introducing a constant temperature line in the monochromator that causes a corresponding negative bending force in the faceplate.

When operating the monochromator, the coolant temperature at the inlet 26 should be below the zero CTE point of silicon, such that the integrated CTE of the silicon faceplate is approximately zero. The desired inlet temperature must be determined empirically based on the interaction between the faceplate thickness, the absorbed heat flux and the efficiency of the upper-level HEX. The desired temperature distribution of the coolant in the upper level HEX is such that when the thermal gradients through the faceplate are established, the faceplate piston distortion, described by:

$$t \int_{T_{coolant}}^{T_{surface}} CTE \, dT$$

where t equals faceplate thickness, $T_{surface}$ equals surface temperature, $T_{coolant}$ equals coolant temperature, is zero since CTE is a function of temperature.

The present invention has been described in conjunction with a low surface distortion X-ray monochromator having a rectangular surface, as opposed to the X-ray source. However, the principles of present invention are equally applicable to devices having other shapes, such as oval or round optical surfaces, and subject to other forms of incident radiation. In addition the principles of the present invention could be used in conjunction with reflective surfaces other than flat surfaces, as shown in the specification. Such surfaces could be either concave or convex. The present invention is equally applicable to any situation where cooling is desired to counteract the adverse effect of high heat absorption in an optical surface or device.

In view of the above, it is apparent that the present invention basically provides an improved cooling system; however, the unique configuration of the cooling components further provides for low surface distortion.

What is claimed is:

1. A device having a surface subjected to external heating, said device comprising:
    a faceplate having first and second spaced surfaces, said first surface being the surface subjected to external heating;
    a body having a surface sized and configured to be in juxtaposition with and sealed to said second surface of the faceplate;
    a first heat exchanger formed in said body proximate said body surface for cooling the faceplate;
    a second heat exchanger formed in said body for maintaining an isothermal area substantially parallel to said body surface and intersecting a neutral bending axis of the device, such that heat induced bending moments are minimized, resulting in low surface distortion, said second heat exchanger being spaced apart from said first heat exchanger; and
    wherein the first and second heat exchangers each include a plurality of channels each having first and second ends, means for providing coolant flow to the first end of each of said channels, a plurality of plenums disposed at the second ends of said channels, each plenum being connected to receive coolant from a group of adjacent ones of said channels, and an orifice formed in each said plenum to facilitate the flow of coolant out of the plenum, each said orifice being sized to control the flow of coolant through the channels associated with the plenum, such that the rate of cooling provided by different groups of channels may be controlled to establish a cooling gradient that can match a heating gradient caused by the external heating.

2. A device as described in claim 1, wherein the first heat exchanger is formed at the body surface and coolant in the heat exchanger is in contact with the second surface of the faceplate.

3. A device as described in claim 2, additionally comprising:
    first pump means for providing coolant to said heat exchangers; and
    second pump means for extracting coolant from said heat exchangers, whereby the coolant pressure in the heat exchangers may be adjusted to minimize pressure on the faceplate and consequent bending forces exerted thereon.

4. A device as described in claim 3, wherein the faceplate has a thickness of on the order of about 100 um, so that the surface material of the faceplate is in close proximity to the first heat exchanger for efficient cooling of the device surface.

5. A device as described in claim 1, wherein the first heat exchanger has a coolant inlet and a coolant outlet; and
    said second heat exchanger has a coolant inlet and a coolant outlet, said outlet of said first heat exchanger being connected to the inlet of said second heat exchanger.

6. A device as described in claim 5, wherein the first heat exchanger is formed at the body surface and coolant in the heat exchanger is in contact with the second surface of the faceplate.

7. A device as described in claim 6, additionally comprising:

first pump means for providing coolant to said first heat exchanger inlet; and second pump means for extracting coolant from said second heat exchanger outlet, whereby the coolant pressure in the heat exchangers may be adjusted to minimize pressure on the faceplate and the consequent bending forces exerted thereon.

8. A device as described in claim 7, wherein the faceplate has a thickness of approximately 100 um, so that the surface material of the faceplate is in close proximity to the first heat exchanger for efficient cooling of the device surface.

9. A device as described in claim 1, wherein said first heat exchanger has a pair of coolant inlets disposed on opposite sides of said device and a coolant outlet; and said second heat exchanger has a coolant inlet and a pair of coolant outlets disposed on opposite sides of said device, said coolant outlet of the first heat exchanger being connected to the coolant inlet of said second heat exchanger.

10. A device as described in claim 9, wherein the first heat exchanger is formed at the body surface and coolant in the heat exchanger is in contact with the second surface of the faceplate.

11. A device as described in claim 10, additionally comprising:

first pump means for providing coolant to the pair of coolant inlets of said first heat exchanger; and second pump means for extracting coolant from the pair of coolant outlets of said second heat exchanger, such that the coolant pressure in the heat exchangers may be adjusted to minimize pressure on the faceplate and the consequent bending forces exerted thereon, so that the faceplate thickness may be minimized and the coolant flow through the heat exchangers is symmetrical, thereby limiting flow-induced non-symmetrical force loading on the device.

12. A device as described in claim 11, wherein the faceplate has a thickness of approximately 100 um, so that the material of the faceplate is in close proximity to the first heat exchanger for efficient cooling of the device surface.

13. A device as described in claim 11, wherein the first and second pump means each comprise a pair of pumps.

14. A device as described in claim 1, wherein the faceplate is formed of silicon and coolant is provided in the heat exchangers at a temperature below a zero coefficient of thermal expansion point of silicon so that an integrated coefficient a thermal extension of the silicon faceplate approximates zero.

15. A device as described in claim 1, wherein the plenums have a tapered passage having a wide first end which receives said coolant and a second end that defines said orifice.

16. A device as described in claim 1, wherein the tapered passages have an elliptical cross-section and a smooth, continuous surface to prevent turbulent coolant flow.

17. A device as described in claim 1, additionally comprising a return header connected to said orifices for receiving coolant flow from the orifices.

18. A device as described in claim 17, wherein the means for providing coolant flow to the first end of each of said channels comprises:

a supply header receiving said coolant;

a plurality of branch tubes extending from said supply header; and a like plurality of macro-channels each associated with a branch tube for receiving coolant from the branch tube, said macro-channels each supplying one of said groups of channels.

19. A device as described in claim 18, wherein the return header of the first heat exchanger is connected to the supply header for the second heat exchanger.

20. A device as described in claim 17, wherein the return header of the second heat exchanger extends across said body and has an outlet port at each end and a partition midway to separate coolant flow to said outlet ports.

21. A device as described in claim 1, wherein the means for providing coolant flow to the first end of each said channels of the first heat exchanger extends across said body and bisects the body, said plurality of channels extending in first and second opposite directions from said means for providing coolant flow.

22. A device as described in claim 21, wherein said first heat exchanger additionally comprises first and second return headers each connected to receive coolant flow from said orifices.

23. A device as described in claim 22, wherein the means for providing coolant flow to the first end of each of said channels of the first heat exchanger includes a supply header extending across said body and having first and second inlet ports disposed on opposite ends of said supply header, such that inlet coolant flow forces exerted on the device are balanced.

24. A device as described in claim 23, wherein the first and second return headers of the first heat exchanger are connected to the means for providing coolant flow to the first end of each of said channels of said second heat exchanger.

25. A device as described in claim 21, wherein the macro-channels each supply two of said groups of channels extending in opposite directions, said macro-channels being separated by partitions and having additional partitions segmenting said macro-channels into two portions, said additional partitions bisecting said branch tubes to provide the coolant flow to the groups of channels extending in said first and second directions, said partitions extending to the surface of said body to provide support for said faceplate.

* * * * *